United States Patent [19]
Pruvot

[11] 3,891,283
[45] June 24, 1975

[54] SELF-FEEDING HYDROSTATIC
[75] Inventor: Francois C. Pruvot, Billancourt, France
[73] Assignees: Regie Nationale des Usines Renault, Billancourt, France; Automobiles Peugeot, Paris, France
[22] Filed: Oct. 16, 1972
[21] Appl. No.: 297,737

[30] Foreign Application Priority Data
Oct. 18, 1971 France .............................. 71.37334

[52] U.S. Cl. ...................... 308/5 R; 308/9; 308/122
[51] Int. Cl. ............................................. F16c 17/00
[58] Field of Search ............................ 308/5, 9, 122

[56] References Cited
UNITED STATES PATENTS

| | | | |
|---|---|---|---|
| 2,004,254 | 7/1935 | Taub.................................. | 308/122 |
| 2,158,835 | 5/1939 | Schmidt............................. | 308/122 |
| 2,689,626 | 9/1954 | Peters ................................ | 308/5 R |
| 3,351,394 | 11/1967 | Hooker.................................. | 308/9 |
| 3,620,581 | 11/1971 | Heller...................................... | 308/9 |
| 3,635,532 | 1/1972 | Zerbola.............................. | 308/5 R |

FOREIGN PATENTS OR APPLICATIONS
111,878   2/1944   Sweden............................... 308/122
514,555   3/1921   France................................ 308/122

*Primary Examiner*—Charles J. Myhre
*Assistant Examiner*—R. H. Lazarus
*Attorney, Agent, or Firm*—Stevens, Davis, Miller & Mosher

[57] ABSTRACT

Hydrostatic bearing comprising a first and second surface elements registering with each other and disposed at a short distance from each other. These elements are caused to move in relation to each other with a tangent speed at all points of the first surface element, and comprises a recess bounded by the second surface element, and adapted to be filled with a fluid under pressure liable to leak between said first and second surface elements. The second surface element constitutes a sealing surface surrounding said recess. In this structure, the recess is fed with fluid from a source at the end of a groove disposed in the direction of the relative motion between the two surface elements; this groove, of moderate width and relatively shallow in comparison with the recess dimensions, being formed on the second surface element and limited laterally by sealing surfaces belonging to the second surface element.

4 Claims, 13 Drawing Figures

SELF-FEEDING HYDROSTATIC

The present invention relates in general to bearings and has specific reference to bearings designed for supporting the load applied by a member driven at a relatively high speed to a fixed member, or vice versa.

It is known to use rolling-contact bearings such as ball-bearings, roller-bearings, needle-bearings for supporting the stress exerted by a fixed member on another member movable in rotation or translation.

These bearings cannot be used in all cases for the rolling elements (i.e., balls, rollers, needles) exert considerable strain on the races of which the technological and machining characteristics must be extremely accurate. Therefore, it is customary to interpose between the solid members in relative motion ring members between which the rolling elements are caused to roll. A well-known example is that of machine tools: due to the considerable number of parts constituting the bearing it is extremely difficult to manufacture spindles incorporating rolling-contact bearings affording a high degree of precision and yielding very satisfactory surface conditions.

In other cases, it is definitely precluded to use rolling-contact bearings for their useful life is not satisfactory. A known example in this field is that of hydraulic pumps of the rotary cylinder barrel type, wherein the use of bearings for absorbing axial and radial stresses transmitted to the driving shaft by the pistons is attended by severe speed and/or pressure limitations.

It is also known to use plain circular bearings lubricated by the so-called hydrodynamic method. As a rule, these bearings are employed in constructions characterised by high sliding-contact speeds, but in this case their operating clearance or play must be relatively high (generally one-thousand of the diameter for the diametral clearance or play). Under these conditions, the centering is relatively poor and the bearing rigidity is questionable. Moreover, the power consumption is relatively high if considerable stress is exerted, even if the stress value is kept to a relatively low value, on account of the oil film shearing effect.

Lobed bearings are also used in the form of a bushing formed with radial bosses across which the clearance between the rotary shaft and the bushing is very small whereas between the bosses the clearance increases. These bearings are used in machine tools and operate with plays considerably lower than those of circular bearings. In many cases play adjustment means (operating by distortion) are provided for restoring an acceptable bushing shape after the latter has been altered considerably as a consequence of wear and tear clearances. The power loss produced in these bearings may be relatively important at high speeds.

In all these bearings types the oil feed system must be checked carefully and regularly, for a want of lubricant is attended by a rapid if not immediate wear and tear of the bearing.

Other, so-called "hydrostatic" bearings are also known wherein the position of the rotary member in relation to the fixed member is independent of the speed of the rotary member, irrespective of the conditions of operation of the bearing, and as long as the maximum permissible bearing load value is not attained, no contact will take place between the rotary member and the fixed bearing. These results are obtained by forming in the fixed bearing at least one recess of relatively considerably depth, bounded by sealing surfaces, a reduced play being provided between the rotary member and said surfaces.

Each recess is supplied separately with fluid under pressure through a so-called "pressure loss." It is proved that the pressure prevailing in each recess is a decreasing function of the oil film thickness between the rotary member and the sealing surfaces of the recesses. Although this bearing has certain important advantageous features in comparison with the other bearing types, its designers are usually confronted with a number of problems as far as its practical use is concerned. Thus, for example:

it is necessary to have a separate pumping unit connected through pipe lines to all the bearings to be supplied with lubricant;

the scarce reliability of the bearings operating with a single pumping unit makes it necessary in some cases to duplicate the pumping units;

to avoid bearing damages, a reserve of fluid under pressure must be provided and used as long as the rotary members are operative;

the losses of pressure in the supply of lubricant to the bearing recesses may become clogged if they consist of small-sectioned channels.

Other hydrostatic bearings are known wherein the feed pressure is obtained by means of a viscosity pump comprising two bearing members kept in relative motion. This pump consists of relatively shallow grooves surrounding a chamber in which the pressure builts up. These bearings are adapted to withstand operating stresses but since as a rule their rigidity is relatively low, they cannot ensure an accurate relative position between the two component elements of the bearing.

The present invention provides an improved hydrostatic bearing comprising two elements, i.e., a fixed element and a movable element, respectively, of which the bearing capacity is obtained by developing the static pressure of a fluid filling at least one recess formed in the fixed element of the bearing and bounded on the one hand by the movable element of the bearing and on the other hand by sealing surfaces of relatively moderate width. These surfaces are adapted to limit leakages between the recess in which the fluid pressure prevails and the external medium, and under these conditions acts as a throttle varying in proportion to the distance from the movable element to the fixed element of the bearing; since the bearing is self-fed, no external feed pump is required. This bearing is free of pressure losses or means for limiting the feed output.

The bearing according to this invention comprises relatively movable first and second surface elements so that the relative speed of the two elements be tangent at any point of the first surface element.

The second surface element comprises a recess the opening of which is surrounded by a sealing surface. The two surface elements are furthermore separated by a clearance which is reduced in proportion to the depth of said recess. In this bearing the stresses developing between said surface elements are balanced by a fluid under pressure filling said recess, whereby no contact actually takes place between said surfaces.

This bearing is characterised in that the recess is supplied with fluid under pressure through a groove formed in the direction of relative motion between said two surface elements (the other end of said groove being connected preferably to a low-pressure fluid source) and said groove, of moderate width and depth in relation to the dimensions of said recess, is formed on the second surface element and bounded laterally by sealing surfaces of said second surface element, the dimensional characteristics of the recess, of the groove and of their sealing surfaces being so selected that any variation in the distance between the two surface elements corresponds to a predetermined variation in the pressure prevailing in said recess and therefor to a certain predetermined rigidity of the bearing.

Other characteristic features of this invention will appear as the following description proceeds with reference to the attached drawings illustrating diagrammatically by way of example a typical form of embodiment of the bearing of this invention. In the drawings.

Figure 1:
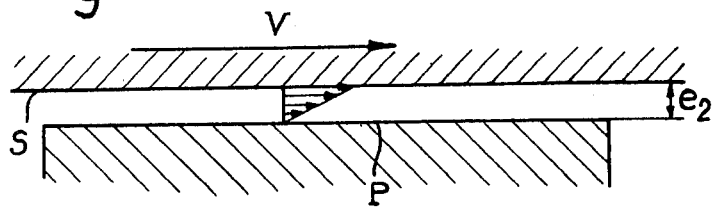
FIG. 1 is a diagrammatic illustration of two surface elements to which a relative speed is imparted, these elements being separated by a gap filled with fluid.

Referring to the drawings, FIG. 1 illustrates a flat surface S travelling at a speed V in a direction parallel to this surface. Obviously, if the surface S were not flat but of revolution, the mode of operation would be the same as that described hereinafter.

Assuming a fixed shoe having a surface P parallel to the surface S and located at a distance $e_2$ from this surface S. Let $L_1$ be the width of this shoe. If this assembly is immersed into a wetting fluid and if the fluid film shearing forces are proportional to the shearing speed or rate, it is known that the fluid will be carried along by the flat surface S, between the surfaces S and P. It is also known that the speed of a fluid molecule in contact with surface P will be zero, that the speed of a fluid molecule in contact with surface S will be V, and that the speed of a molecule lying between S and P at a distance $y$ from S will be proportional to (V) and to $(e_2 - y)$.

Figure 2:
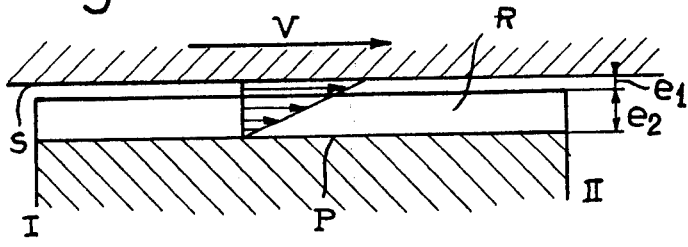
FIG. 2 is a diagrammatic illustration of the same surface elements bounded by sealing surfaces.
Figure 5:
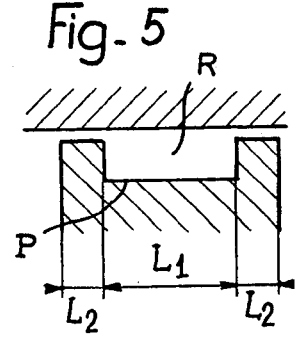

According to FIGS. 2, 5 the shoe P comprises on either side of the width $L_1$ two sealing surfaces having a width $L_2$, located at a distance $e_1$ from surface S, which is small in relation to $e_2$, said surfaces providing therebetween a groove R.

If $L_1$ is large in relation to $e_2$, the fluid flow through the groove bounded laterally by the sealing surfaces may be considered as a bidirectional one and the diagram of speeds will be the same as in the case of FIG. 1.

However, it may be added that the movement of surface S will be attended by a pumping effect since the fluid will be taken from the side "I" of the shoe having a surface P, and thus conveyed to the other side "II." Under these conditions the average output will be $Q = \frac{1}{2} V L_1 (e_2 + e_1)$, provided of course that no pressure differential exists between sides I and II of shoe P. Thus, the groove R formed in this shoe and along which the surface S is caused to travel will act as a pump.

Figure 3:
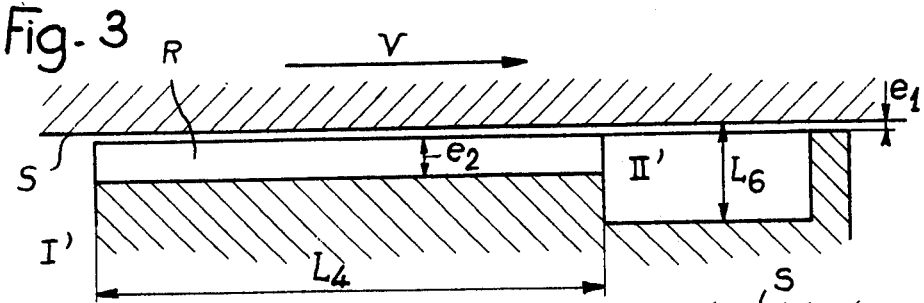
FIG. 3 is a diagrammatic illustration of a hydrostatic bearing according to the present invention.
Figure 6:
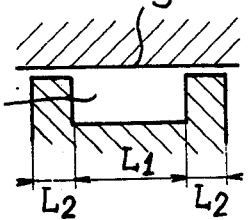
Figure 7:
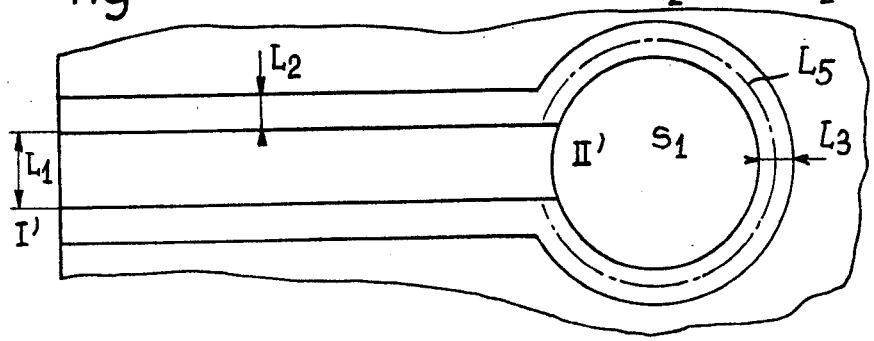
FIG. 7 is a fragmentary plane view from above of the bearing of FIG. 3.

Now let us assume that, as shown in FIG. 3, the groove R of length $L_4$ opens at one end into a space I' in which a pressure Po prevails. The other end of the groove will open into another space II' formed by a recess having a surface $S_1$ and a perimetral dimension $L_5$; now this cavity is surrounded completely by a sealing surface having a width $L_3$ and coplanar with the sealing surface of groove R of width $L_1$, therefore at the distance $e_1$ from surface S.

Now evidence will be given of the fact that a pressure, depending among other variables on the speed V and gap $e_1$, is constantly maintained in said space II'.

Assuming that the surface S be infinitely close to the show surface P but without any mechanical contact therebetween. It will be seen that as in the preceding case the shoe will carry along oil towards the recess with an output $Q_e = \frac{1}{2} V L_1 e_2$.

Since the volume of the recess and the volume of groove R are constant, it is required that an output signal equal to $Q_e$ escapes from the bearing containing a constant mass of fluid. As $e_1 \approx 0$, no leakage can take place between the shoe and the surface S; under these conditions, the leakage will be caused by a fluid output $Q_i$ in the groove but in a direction opposite to that of the entraining output $Q_e$.

If $P_1$ is the pressure prevailing in the recess, the well-known formula:

$$Q_i = (1/12\mu) \times (L_1/L_4) \times e_2^3 \times P_1$$

will be obtained.

The combination of the two preceding formula will thus give, since $Q_e = Q_i$:

$$P_1 = (6 V \mu L_4/e_2)$$

wherein $\mu$ designates the absolute viscosity of the fluid.

It will be noted that if the groove height $e_2$ is divided by 2, the pressure $P_1$ is multiplied by 4.

Figure 4:
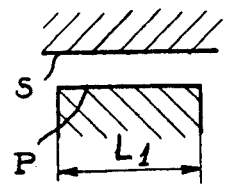
FIGS. 4, 5 and 6 are cross-sectional views corresponding to FIGS. 1, 2 and 3, respectively.

If in the diagram of FIG. 4 the leakage outputs of the bearing are plotted in abscissae against the pressures generated by the bearing recess, in ordinates, it will be seen that the leakage output $Q_f$ will be equal to the conveyed or entrained output $Q_e$, that is, $\frac{1}{2} V L_1 e_2$, the pressure in the bearing will be zero.

In contrast thereto, if the leakage output $Q_f$ is zero, a pressure:

$$P = (6 V \mu L_4/e_2)$$

(1)

will be obtained in the bearing.

Now let us assume that the thickness of the oil film $e_1$ between the surfaces S and P has a positive value.

Assuming that only one recess $S_1$ will produce a leakage, the reverse output $Q_i$ in the groove will thus be equal to the entrained output $Q_e$ minus the bearing leakage output $Q_f$. If we further assume that the leakages occurring along the sealing surfaces of the groove have a negligible value, the reverse output in the groove ($Q_i$) will remain constant throughout the groove. Now it is known that $Q_i$ (since the flow is of lamellar character) is proportional to the pressure prevailing in the bearing P. Under these conditions, there is a linear relationship between the leakage output of the bearing and the pressure prevailing therein (straight line ($\Delta$) ).

Moreover, it is known that:

$$Q_f = (1/12\ \mu) \times (L_5/L_3) \times e_1^3 \times P \quad (2)$$

This relationship between the leakage output $Q_f$ of the bearing and the pressure P prevailing therein is well known in the art. The corresponding curves are straight lines such as $e_{10}$, $e_{11}$, etc. According to the values of $e_1$, the point of operation B, C, D of the bearing will be at the intersection of said straight line ($\Delta$) giving the bearing pressure as a function of its leakages and of the various straight lines $e_{10}$, $e_{11}$, etc. . . having an inclination:

$$(P/Q) = (12\ \mu L_3/L_5\ e_1^3)$$

Then it is an easy matter to determine, from the above equations (1) and (2), the bearing capacity (with due consideration for its surface area $S_1$).

In fact, due to the leakages developing along the sealing surfaces proper, the curve corresponding to the bearing operation is not exactly a straight line but a series or cluster of curves ($\alpha$) all beginning at the same points on the two axes and having upward-facing concavities.

These curves obviously depart rather moderately, for the conventional values of the various parameters, from the straight line corresponding to the simplest analysis of the operating conditions.

As in the case of conventional hydrostatic bearings, the maximum rigidity of the bearing is obtained under a fluid pressure, measured in the bearing recess, substantially equal to half the pressure assumed for a zero leakage output.

On the other hand, ($\beta$) is the straight line representing the characteristic $P = f(Qf)$ of a bearing of which the width of the feed groove were ($L_1/2$). The preceding equations show that if $e_1 = 0$, the pressure will be $P_1$, but the output under zero pressure will be half the output $Q_e$ corresponding to said width $L_1$. It will be seen that this variation of $L_1$ will cause a proportional variation in the bearing rigidity. Finally, it is an easy matter to prove that the bearing rigidity is proportional to the shoe speed and fluid viscosity.

The straight line ($\gamma$) designates the bearing operation when the height $e_2$ of groove R is divided by 2. It may also easily be proved that the pressure value under zero output conditions is then multiplied by 4, but the output $Qf$ under zero pressure conditions is divided by 2. It will be seen that the bearing rigidity is greatly influenced by this modification.

Figure 9:
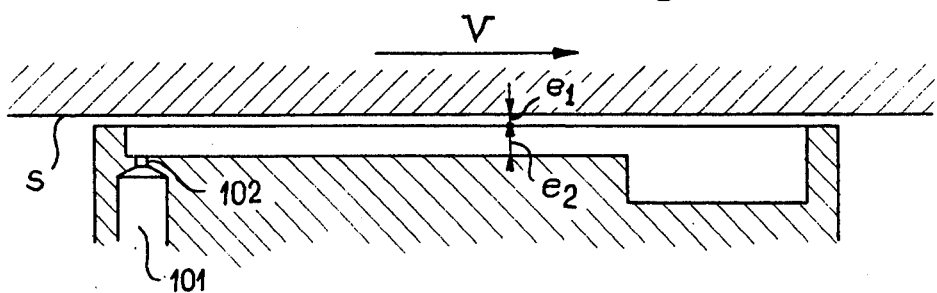
FIG. 9 is a section illustrating a hydrostatic bearing according to this invention and modified with respect to the construction of FIG. 3.

FIG. 9 illustrates a modified bearing construction. The groove R is supplied with fluid under the atmospheric pressure through a passage 101. A thin-walled orifice 102 is provided between this passage 101 and the inlet end of groove R.

This orifice 102 will be so selected that for a one-bar pressure drop the output $Qo$ through said orifice will be lower than the output $Qe$ corresponding to zero pressure in the bearing. It will be seen that as long as the bearing leakage output is below $Qo$ the point of operation will move substantially along the theoretical curve ($\Delta$).

Figure 8:
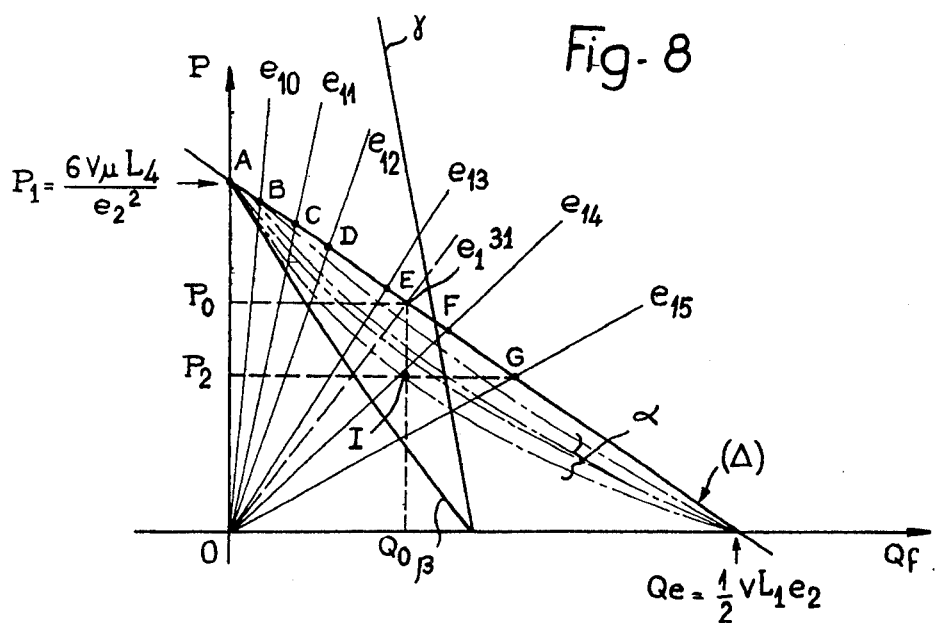
FIG. 8 is a diagram illustrating the operating characteristics of the hydrostatic bearing of FIG. 3.

On the other hand, when the leakage output rises to a value $Q_o$ to which corresponds a pressure $Po$, the bearing behavior will change. In FIG. 8 it will be seen that if the forces acting upon the bearing correspond to a pressure $P_2$, a value $e_{15}$ must be selected for $e_1$. On the other hand, the presence of an output-limiting orifice 102 will change the shape of the characteristic curve of the bearing beyond $Q_o$, which will be the vertical issuing from $Q_o$. The point of operation of the bearing in this case will be point I lying on the straight line $e_{14}$. Thus, the bearing rigidity will be increased.

Figure 10:
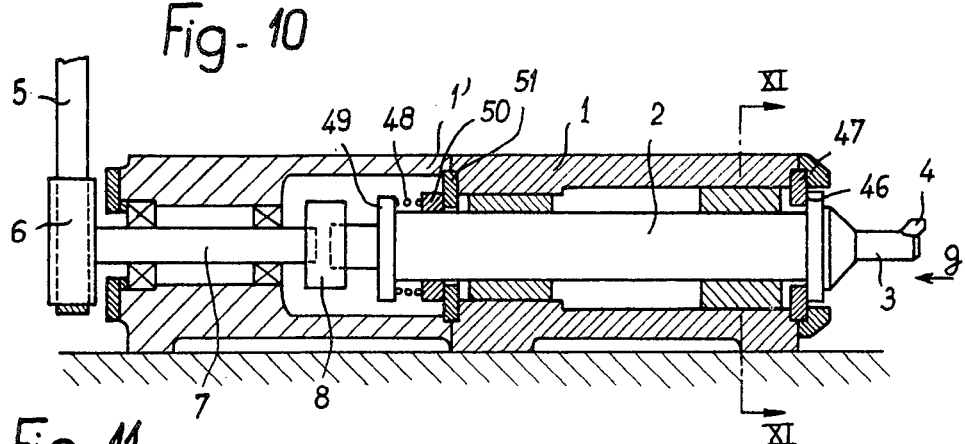
FIG. 10 is a longitudinal section illustrating a machine tool spindle provided with bearings according to this invention.
Figure 11:
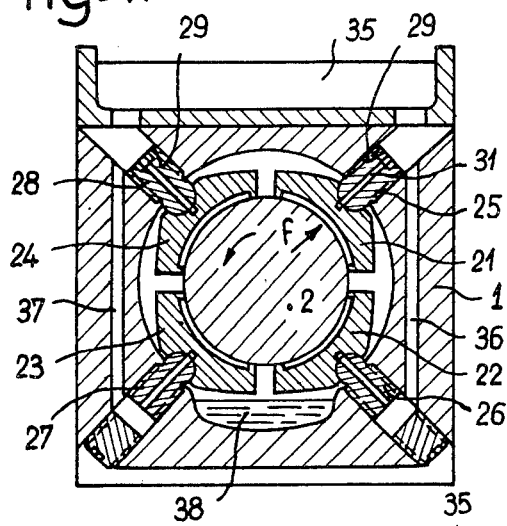
FIG. 11 is a section taken along the line XI—XI of FIG. 10.

FIG. 10 illustrates diagrammatically a machine tool spindle provided with the above-described hydrostatic bearing. It comprises a two-section body 1, 1'. The movable body of revolution of the bearing consists in this case of the rotary spindle designated in general by the reference numeral 2. It is adapted to receive a holder 3 carrying a tool 4. The spindle 2 is driven indirectly through a belt 5. This belt 5 passes over a pulley 6 adapted to drive a shaft 7 coaxial with the spindle 2. A coupling 8 is provided between this shaft 7 and spindle 2. Since this coupling is no part of the present invention, its description is not deemed necessary for a proper understanding of the invention. However, it may be pointed out that it must have a high torsional rigidity but should not transmit to the spindle any stress caused by the misalignment or sag of shaft 7.

The chief advantage resulting from a mounting of this character is that the spindle 2 carries only the cutting efforts resulting from the tool operation, the stress transmitted through the belt 5 being received only by the shaft 7.

Now the manner in which the above-described bearing type is applicable to this spindle will be described by way of example. Of course, many other solutions may be contemplated as will readily occur to those conversant with the art.

Each bearing comprises a separate block 21, 22, 23 and 24. Of course, the number of bearings may be greater or lower than four, without departing from the basic principle of the invention. Each bearing block engages with its intermediate portion a spherical support 25, 26, 27 and 28 of which two (26 and 27) may be fixed and the other two (25 and 28) adjustable by means of screw-threaded portions 29 engaging tapped holes formed in the spindle body 1. With this screw engagement the clearance corresponding to the desired point of operation may be introduced between the spindle 2 and the bearings. As a rule, this clearance will be that corresponding to the maximum rigidity which is the clearance developing in the bearings a pressure equal to half the pressure obtaining with zero operating clearance, when the spindle rotates at its rated speed.

Figure 12:
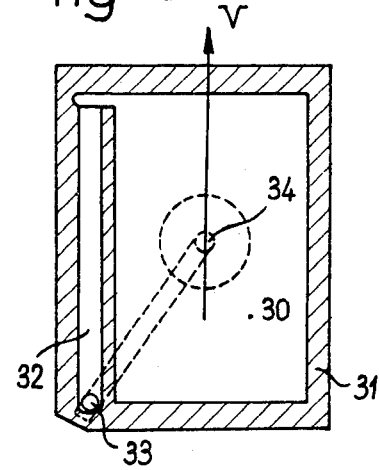
FIG. 12 is a detail view as seen in the direction of the arrow $f$ of FIG. 11.

As shown in FIG. 12 the cavity 30 of each bearing is lined by a sealing surface 31. The groove 32 of the viscosity pump is disposed in the direction of the spindle speed V.

It is supplied through an orifice 33 connected in turn via passages to the hole 34 formed in the spherical centering support 25 of the bearing. All the holes 34 are connected to a gravity-feed fluid reservoir 35 through passages 36 and 37.

The fluid escaping along the bearings will fall into a bottom sump 38 from which it will be drawn through any suitable pumping means and returned to the reservoir 35.

This pumping means may consist of any device capable of transferring oil under pressure. Thus, notably, a viscosity pump capable of delivering an output considerably higher than that of said bearings may be provided, this pump being coupled directly to the driving shaft 7.

Figure 13:
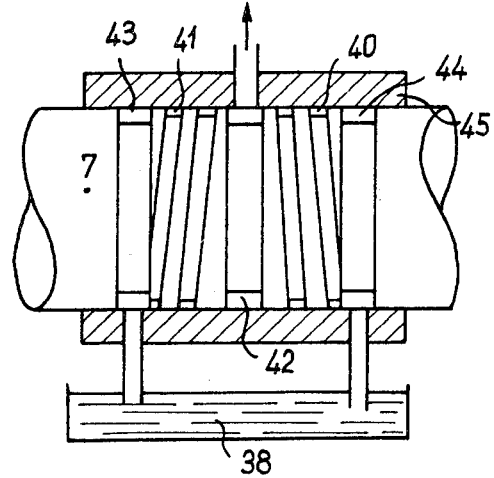
FIG. 13 is a sectional view showing a pump adapted to collect the oil escaping from the spindle bearings.

More particularly, an oil flow from reservoir 38 into the body 1' of driving shaft 7 may be contemplated. As shown in FIG. 13, the shaft 7 carries helical grooves 40, 41 opening on the one hand into an intermediate groove of revolution 42 and respectively into end grooves of revolution 43, 44; the central groove 42 may be connected to reservoir 35 and the end grooves 43, 44 to the bottom sump 38.

The direction of the helices of said grooves 40 and 41 are selected as a function of the direction of rotation of the spindle. By disposing a ring 45 around the shaft 7, a viscosity pump will be obtained.

In the case of spindles likely to be stopped recurrently for relatively long time periods during the actual service of the machine tool, a distributor for example of the electromagnet valve type may be disposed between the fluid reservoir 35 and the feed orifices 33 of these bearings to prevent the reservoir 35 from being drained out completely during stoppages. However, this arrangement is not necessary if the machine tool is equipped with a low-pressure self-driven pump adapted automatically to refill the reservoirs 35 of the various spindles.

In this case, as in the preceding example, it may be advantageous to insert a fine-mesh filter in the delivery line of the pump in order to avoid filling the reservoirs 35 with a polluted fluid. If under normal service or operating conditions the play is 10 $\mu$ between the spindle and the bearings, a filter of 3$\mu$ or 5$\mu$ will be used in order to reduce wear in the various component elements.

For absorbing the axial stress or loads a hydrostatic bearing of the type illustrated in FIG. 10 may be used which consists of a collar portion 46 provided on spindle 2. A washer 47 held against rotation in relation to the two-section body 1 of the spindle is formed in this case with at least one recess and one groove for the fluid.

The spindle illustrated in FIG. 10 can absorb axial loads only in the direction of the arrow g. On the end opposite to the tool, a spring 48 reacting against a shoulder 49 rigid with the spindle is provided for urging a surface of revolution such as a ring 50 held against rotation with respect to the spindle against a washer 51 comprising likewise at least one (and preferably three) recesses and as many feed grooves. It will be seen that the surface of ring 50 extends radially and is of revolution in relation to the axis of rotation of the spindle.

If the spindle is exposed to axial loads in both directions, a pair of washers 47 and 51 should be disposed on either side of a single collar in order to minimize expansion stresses.

Although no sealing or packing means have been illustrated in the various forms of embodiment shown in the drawings, it will be readily understood that their presence is definitely necessary, were it only for preventing any detrimental pollution of the fluid circulating in the hydrostatic bearings, but obviously these means are not included in the scope of this invention.

It will also be seen that although this type of bearing does not permit the separation of the spindle from the bearings at zero speed, in general a very low speed will be sufficient for this purpose. In fact, in the inoperative condition the spindle is supported by the lower bearings 22, 23 and the clearance $e_1$ is then practically zero. When the spindle is started, it rises immediately when the fluid pressure in the bearings (which is normally proportional to the spindle speed), multiplied by the cross-sectional area of the bearings, exceeds the spindle weight. In general, this "floating" effect begins to take place at a speed of the order of a few hundreds of revolutions per minute.

It will also be seen that the reliability of this bearing is particularly high. In fact, in contrast to conventional hydrostatic bearings, of which the pressure losses may be affected by clogging, on the one hand the feed groove is relatively wide (several millimeters) and on the other hand this groove is bounded by surfaces in relative motion, so that it cannot be clogged by impurities.

Finally, it will be noted that in case of electric power failure and provided that the above-mentioned electromagnet valve (if any is provided) does not cut off immediately the oil supply, the hydrostatic bearing will continue to operate as long as the spindle speed is sufficient (in contrast to conventional hydrostatic bearings).

However, it will also be noted that in the above-described example it is assumed that each bearing 21, 22, 23, 24 is supported by a ball-joint. Now this ball-joint will be so arranged and fitted that the resultant of the bearing forces is directed substantially towards its centre. However, it will be seen that the positional stability of the shoe is not assured, at leasat theoretically. Under these conditions, one may either multiply the number of elementary bearings per shoe (and therefore per ball-joint) in order to obtain a stable position (a minimum of three bearings is required), or rely on sealing surfaces but in this case the width of these surfaces must be sufficient to cause them to operate as hydrodynamic shoes, thus assuring the stability of each shoe.

Although a few typical forms of embodiment and applications thereof have been described, illustrated and suggested herein, it will be readily understood by those conversant with the art that various modifications and variations may be brought thereto without departing from the scope of the invention as set forth in the appended claims.

What I claim as new is:

1. Hydrostatic bearing comprising a first surface element being a rotary body of revolution and at least three identical bearing elements having a surface registering with said body of revolution and having a short gap left between their surfaces, and to which a relative speed tangent at all points of the first surface element is imparted, a recess bounded by each of said bearing elements and adapted to be filled with a fluid under pressure liable to leak between said first element and said bearing elements, said bearing elements constituting a sealing surface surrounding said recess, each bearing having said recess supplied with fluid under pressure from a thin-walled orifice at one end of a feed groove disposed in the direction of the relative motion between said first surface element and said bearing element, said groove being formed on each of said bearing elements and being of moderate width and relatively shallow in relation to the dimensions of said recess and bounded laterally by sealing surfaces pertaining to said bearing element, said thin-walled orifice limiting the fluid output in said groove to a value lower than that of the fluid output normally carried along by the first sealing surface when the pressure in said bearing recess is equal to the supply pressure in said groove, said bearing elements being disposed preferably at spaced intervals around said body or revolution, the position of at least one of said bearing elements being adapted to be modified in relation to that of the other elements to permit the adjustment of the clearance left between said bearing elements and said body.

2. Hydrostatic bearing according to claim 1, characterised in that at least three identical bearing elements comprising a recess and a feed groove constitute said second surface element whereas said first surface element consists of a rotary body of revolution, said bearing elements being disposed preferably at spaced intervals around said body of revolution, the position of at least one of said bearing elements being adapted to be modified in relation to that of the other elements to permit the adjustment of the clearance left between said bearing elements and said body.

3. Hydrostatic bearing of the axial guiding type, according to claim 1, for a body of revolution, characterised in that said bearing element comprises a recess and a fluid feed groove and their sealing surfaces, the first surface element consisting of a surface of revolution in relation to the axis of the body of revolution and extends radially in relation to said body.

4. Hydrostatic bearing of a body of revolution, according to claim 3, characterised in that the bearing groove is supplied by gravity with fluid from a fluid reservoir disposed at a higher level than said groove and to the recess of the corresponding bearing, and that this feed can be discontinued by a controlled fluid distributor when the first and second surface elements of the bearing are stationary in relation to each other, said fluid feed having to be restored before re-starting the surface elements in relative movement, said gravity-feed reservoir being filled in turn by means of a suitable pump.

* * * * *